United States Patent
Kalwa et al.

(10) Patent No.: US 10,596,720 B2
(45) Date of Patent: Mar. 24, 2020

(54) METHOD FOR REDUCING THE EMISSION OF VOLATILE ORGANIC COMPOUNDS MADE OF WOOD MATERIALS, AND WOOD MATERIALS

(71) Applicant: SWISS KRONO TEC AG, Lucerne (CH)

(72) Inventors: Norbert Kalwa, Horn-Bad Meinberg (DE); Dirk Müller, Neuruppin (DE); Gunnar Thielecke, Berge OT Neuhausen (DE)

(73) Assignee: SWISS KRONO TEC AG, Lucerne (CH)

(*) Notice: Subject to any disclaimer, the term of this patent is extended or adjusted under 35 U.S.C. 154(b) by 73 days.

(21) Appl. No.: 15/756,801

(22) PCT Filed: Sep. 23, 2016

(86) PCT No.: PCT/EP2016/072642
§ 371 (c)(1),
(2) Date: Mar. 1, 2018

(87) PCT Pub. No.: WO2017/050949
PCT Pub. Date: Mar. 30, 2017

(65) Prior Publication Data
US 2018/0243937 A1    Aug. 30, 2018

(30) Foreign Application Priority Data
Sep. 24, 2015  (EP) .................................. 15186719

(51) Int. Cl.
| | | |
|---|---|---|
| B27N 1/00 | (2006.01) | |
| B27N 3/08 | (2006.01) | |
| C08K 3/04 | (2006.01) | |
| C08K 3/30 | (2006.01) | |
| C08L 97/02 | (2006.01) | |

(52) U.S. Cl.
CPC .............. B27N 1/003 (2013.01); B27N 3/08 (2013.01); *C08K 3/04* (2013.01); *C08K 3/30* (2013.01); *C08L 97/02* (2013.01)

(58) Field of Classification Search
CPC ........... B27N 1/003; B27N 3/08; C08L 97/02
See application file for complete search history.

(56) References Cited

U.S. PATENT DOCUMENTS

| | | | | |
|---|---|---|---|---|
| 4,767,500 A | * | 8/1988 | Patt ........................... | C02F 3/10 162/32 |
| 5,744,079 A | * | 4/1998 | Kimura ................... | B27N 3/002 264/109 |
| 9,012,539 B2 | | 4/2015 | Grunwald et al. | |
| 2005/0207967 A1 | | 9/2005 | Yoshii | |
| 2008/0281013 A1 | | 11/2008 | Nakamura et al. | |
| 2011/0171482 A1 | | 7/2011 | Fujii et al. | |
| 2014/0255279 A1 | | 9/2014 | Olson et al. | |
| 2015/0298346 A1 | | 10/2015 | Borowska et al. | |

FOREIGN PATENT DOCUMENTS

| | | |
|---|---|---|
| CN | 1451464 | 1/2006 |
| DE | 10160316 | 6/2003 |
| DE | 102007038041 | 2/2009 |
| EP | 2176354 | 4/2010 |
| EP | 2698349 | 2/2014 |
| EP | 2727691 | 5/2014 |
| JP | 2003071815 | 3/2003 |
| WO | 2009005974 | 1/2009 |
| WO | 2014072304 | 5/2014 |
| WO | 2017012350 | 1/2017 |

OTHER PUBLICATIONS

International Preliminary Report and Written Opinion for PCT/EP2016/072642 dated Mar. 27, 2018, 8 pages.
International Search Report for PCT/EP2016/072642 dated Nov. 29, 2016, 9 pages.

* cited by examiner

*Primary Examiner* — Robert D Harlan
(74) *Attorney, Agent, or Firm* — Andrew M. Calderon; Roberts Calderon Safran & Cole, P.C.

(57) ABSTRACT

The present invention relates to a method for producing wood materials from lignocellulose-containing crushed products, in particular for producing wooden insulating panels or OSB boards, wherein in order to decrease or reduce the emission of volatile organic compounds (VOC) and, if relevant, very volatile organic compounds (VVOC), including terpenes, acids and aldehydes, said wood materials are treated with a combination of additives during production. According to the invention, the treatment is carried out with a first component made of porous carbon and a second component, a hydrogen sulphite salt. The invention further relates to wood materials that can be obtained using the method according to the invention, having reduced emissions of VOCs, including terpenes, acids and aldehydes. Finally the present invention relates to the use of a combination of additives, formed by a first component with a porous carbon and a second component made of hydrogen sulphide salt, for decreasing or reducing the emission of VOCs from wood materials during or after production thereof from lignocellulose-containing crushed products.

26 Claims, No Drawings

METHOD FOR REDUCING THE EMISSION OF VOLATILE ORGANIC COMPOUNDS MADE OF WOOD MATERIALS, AND WOOD MATERIALS

The present application relates to a process for the production of wood-based materials made of lignocellulose-containing comminution products, in particular for the production of wooden insulation board or OSB, where these wood-based materials are treated with a combination of additives during the production process in order to reduce emission of volatile organic compounds (VOCs) and optionally of very volatile organic compounds (VVOCs), inclusive of terpenes, acids and aldehydes. This treatment is achieved in the invention by using a first component made of porous carbon and a second component which is a hydrogensulfite salt. The application moreover relates to wood-based materials obtainable by using the process of the invention and exhibiting reduced emission of VOCs, inclusive of terpenes, acids and aldehydes. Finally, the present application is directed to the use of a combination of additives made of a first component with a porous carbon and a second component made of hydrogensulfite salt for reducing emission of VOCs from wood-based materials during and after production thereof from lignocellulose-containing comminution products.

PRIOR ART

Lignocellulose and lignocellulose-containing materials, for example wood and wood-comminution products, and wood-based materials produced therefrom, for example wood-based board, comprise inter alia volatile organic compounds (VOCs) and very volatile organic compounds (VVOCs). Emission of these VOCs and VVOCs, also described as total quantity of volatile organic compounds (TVOC), from the wood-based materials (WCMs) is a serious problem in view of the increasing use of wood-related products in interiors. Among the volatile organic compounds are not only the saturated and unsaturated aldehydes but also all of the volatile organic substances with gas-chromatograph retention time between C6 (hexane) and C16 (hexadecane). An appropriate relevant definition is also found in the evaluation system of the AgBB (Ausschuss zur gesundheitlichen Bewertung von Bauprodukten, Deutschland [German Committee for Health-related Evaluation of Building Products]) for VOCs from construction products, as at 2015. Rather than being a homogeneous class of substances, VOCs are a miscellany of compounds. It comprises inter alia organic acids, saturated and unsaturated aldehydes, alcohols, terpenes, aliphatic and aromatic hydrocarbons and many other compounds. Among these are the very volatile organic compounds (VVOCs), which include by way of example formaldehyde and formic acid. Above the VOCs are the semivolatile organic compounds (SVOCs) with retention ranges above C16 to C22.

These TVOCs arise not only during the production of the wood-based materials but also during use thereof. On the one hand, TVOCs with VOCs and VVOCs can arise from adhesives during hardening, and on the other hand these compounds can arise via reaction of compounds present in the wood-based material. In particular, a substantial cause of emission of the VOCs is release of wood-derived compounds. Accordingly, emission of the VOCs usually rises initially after the production process to an emission maximum. This emission maximum, in particular in relation to aldehydes, mostly occurs a few weeks after production of the particular WCM.

Emission of these volatile and very volatile wood ingredients or constituents of the adhesives from wood products made from one of these WCMs is increasingly problematic, because of imposition of lower threshold values and greater awareness among end consumers.

Chemical compositions and quantities of VOCs and VVOCs released can vary, depending inter alia on the nature and condition of the lignocellulose materials, for example the type of wood, the storage time, and the conditions under which the wood, or the comminution products of the wood, is/are stored. The VOCs here in essence derive from degradation products of the lignocellulose materials. Prominent among these are the terpenes α-pinene, β-pinene, and δ-3-carene. These constituents are especially found in conifers, used as feedstock for OSB or fiberboard. Aldehydes, for example pentanal and hexanal. are transformation products arising for example during storage of, and operations carried out on, wood and comminution products.

Softwoods, mainly used to produce particle board, fiberboard such as MDF, or OSB, especially comprise large quantities of resins and fats which contribute to the formation of volatile organic terpene compounds and aldehydes. However, VOCs and VVOCs can also be produced when various adhesives are used to produce the wood-based materials. The ingredients of the wood, for example the fatty acids, usually undergo an oxidation process here due to the presence of oxygen, and these then lead to secondary or tertiary emission of aldehydes such as pentanal, or of higher carboxylic acids, and thus contribute to VOC emission.

VOC emission from wood-based materials therefore derives substantially from release of wood-related materials rather than from release of materials related to the adhesive used. In particular, ongoing transformation of constituents of the wood-based materials, for example through fragmentation of the resins and fats, results in continuous secondary and/or tertiary emission of the compounds mentioned.

Two groups of substances are now regarded as particularly problematic in terms of quantity and resultant unpleasant odor and/or toxicity: terpenes and saturated and unsaturated aldehydes. Whereas the terpenes are emitted directly from the comminution products and from the wood-based material, the aldehydes are mostly formed slowly from unsaturated fatty acids by oxidation in the presence of atmospheric oxygen. When emissions are measured, therefore, the emission maximum of the terpenes is mostly found directly after production, whereas the emission maxima for the aldehydes are usually not reached until a few weeks later. In Germany, the Ausschuss zur gesundheitlichen Bewertung von Bauprodukten [Committee for Health-related Evaluation of Building Products] (AgBB) has devised an evaluation system for VOCs from construction products which accordingly also describes the measurement and assessment of emissions, for example in AgBB Bewertungsschema für VOC aus Bauprodukten [Valuation system for VOCs from construction products]; as at 2015, the content of which is hereby incorporated by way of reference.

The system described in that document states requirements not only in relation to measurement but also in relation to maximal permissible emission. Simply stated, emission from a construction material must be less than 1 mg/m$^3$ during a test period of 28 days under standardized conditions. Additional restrictions apply for highly toxic compounds. By way of example, the maximal permissible total contribution from carcinogenic substances is 1 µg/m$^3$.

In the case of wood-fiberboard, VOC emission increases as the density of the wood-fiberboard decreases. Whereas high-density fiber board (HDF) or medium-density fiber board (MDF) exhibit at most a slight increase in VOC values, lightweight fiberboard and superlight fiberboard with envelope density below about 250 kg/m$^3$ generate considerable VOC emission. The low density here accelerates diffusion processes. The same applies to insulation board with envelope density from 50 to 80 kg/m$^3$.

Various attempts have already been made to restrict emission of VOCs and VVOCs. Addition of a very wide variety of additives is described. By way of example, EP 2176354 describes the use of a combination of additives with buffer capacity made of hydrogensulfite salts and sulfite salts. WO 2017/012350 and DE 10160316 describe processes in which a component such as bisulfite is used, but there is a restriction here to fiberboard, because the bisulfite is added to the wood chips before the refiner. A further disadvantage of the process described in those documents is introduction into the refiner, because the resultant losses due to evaporation of SO$_2$ and due to the water removed in the press are particularly high. WO 2017/012350 moreover is directed exclusively to formaldehyde.

EP 2727691 B1 describes a process for reducing emission of volatile organic compounds from wood-based materials via activated carbon as additive. It was found that the activated carbon can reduce some of the VOCs, but addition of these additives was unable to achieve this for the entire heterogeneous group of the VOCs. It is moreover known that addition of reducing agents, for example formamidinesulfinic acid or ascorbic acid, can reduce emission of saturated and unsaturated aldehydes. However, this reduction is insufficient to bring total emission of the VOCs, and in this case of the terpenes, below the levels required by the AgBB system.

CN 1451464 A discloses a process for the elimination of aldehydes and VOCs. This uses a plant extract which is produced in advance inter alia via extraction with a liquid comprising sodium bisulfite and removed by filtration inter alia via use of activated carbon as filtration agent. However, there is no description of the capability of sodium bisulfite and activated carbon to reduce emission of VOCs.

There has been almost no disclosure of additives that reduce total emission of VOCs and, where appropriate, VVOCs.

Further problems arise from the fact that additives are mostly added only in the form of aqueous solution, thus increasing moisture content within the production process. Addition of the additives not only increases costs but can also, because the substances are chemically aggressive, lead to corrosion on machinery components and system components. Effects hazardous to health can moreover occur via emission of the additives used or of retention products thereof with ingredients of the other constituents of the wood-based materials during the production process, in particular press processes with heat treatment, or during subsequent use.

Additives can moreover reduce the reactivity of the adhesives used. Mechanical parameters of the wood-based boards to be produced are thus adversely affected. Larger quantities of the adhesive are added in order to compensate for these adverse effects due to addition of the additives, with the aim of achieving the required and/or desired mechanical parameters, and this increases production costs.

Emission limits are undergoing constant further reduction, for example as a result of the abovementioned requirements of the AgBB, and also as a result of consumer requirements. Correspondingly, the demand for wood-based materials with low VOC emissions is constantly increasing, and there is a corresponding requirement for provision of additives that reduce emission of VOCs and, where appropriate, VVOCs, i.e. total emission (TVOC) from wood-based materials in all their various forms.

A particularly important requirement here is that the desired reduction of TVOCs, i.e. VOCs and, where appropriate, VVOCs, from the wood-based materials can also be achieved during prolonged use. The additives must accordingly not only reduce the direct emission of VOCs during the production process but also in particular reduce emission of VOCs, and also VVOCs, for example terpenes, acids and also aldehydes and other compounds released in the form of degradation products of fatty acids, as secondary and/or tertiary emission from the wood-based materials.

OSB (oriented strand board) has become established in recent years in Europe as new construction material for a very wide variety of applications. In Europe, unlike in North America, construction of prefabricated houses is not the main use of OSB. In contrast to most other wood-based materials, this product is usually used without any additional surface coating. Another factor requiring consideration in the production of OSB is that, unlike in the case of other wood-based materials, OSB is in essence produced from wood coming directly from the forest (mostly softwood). Use of wood coming directly from the forest in combination with use in the uncoated/non-surface-finished condition leads to problems relating to emission from these wood-based materials.

SUMMARY OF INVENTION

It is therefore an object of the present invention to provide processes which can produce wood-based materials, for example fiberboard, OSB and wooden insulation board, and which reduce to the greatest possible extent the emission of VOCs and TVOCs, inclusive of terpenes and acids, and also aldehydes. Compliance with the requirements of the AgBB system should be achieved here. The intention here is that the additives themselves are neither toxic nor lead to any optical impairment of the surface of the OSB or to impairment of other mechanical properties of the wood-based materials, for example the OSB. The intention is that the wood-based materials, for example the OSB, do not become substantially more expensive by virtue of the modified production process and by virtue of addition of auxiliaries. The additives used here should have no adverse effect on the actual production process, and in particular should not reduce the reactivity of the adhesives used.

DESCRIPTION OF THE INVENTION

The object of the present invention is achieved via a process with the features of claim 1, and also via the use of a combination of additives as per claim 13 and the wood-based material as per claim 15. The dependent claims list advantageous embodiments and further developments of the invention.

An important aspect of the present invention is the use of the combination of porous carbon, in particular activated carbon, with a hydrogensulfite salt, for example ammonium hydrogensulfite.

A first aspect of the present invention is therefore directed to a process for the production of wood-based materials made of lignocellulose, in particular wood-based materials with reduced emission of volatile organic compounds (VOCs) inclusive of terpenes, acids and aldehydes, comprising the following steps:
a) provision of lignocellulose-containing comminution products;
b) bringing the lignocellulose-containing comminution products into contact with a combination of additives with a first component made of a porous carbon and a second component made of a hydrogensulfite salt;
c) compression-molding of the lignocellulose-comminution products admixed with the combination of additives, with heat treatment, with adhesive to produce the wood-based material.

The wood-based materials are in particular wood-based boards inclusive of fiberboard and OSB, and lightweight and superlight fiberboard and wooden insulation board.

Use of this combination of additives can overcome the present disadvantages with use of porous carbon for example in the form of activated carbon alone, and in particular permits long-term achievement of values below the threshold values required in the AgBB system for provision of wood-based materials. Production with the additives mentioned permits provision of products, for example OSB, which can then also be used in additional sectors, in particular in indoor sectors. It has been found that the total quantity of VOCs and VVOCs emitted by the wood-based materials can be reduced by use of activated carbon, and additionally that secondary and tertiary emission of VOCs, in particular here of saturated and unsaturated aldehydes, can also be markedly reduced via use of the hydrogensulfite salts. This reduction could be achieved not only in the short term: in particular it has been found that the reduction is also achieved over a prolonged period. The combination of the additives permits compliance with the requirements set out in the AgBB system.

The expressions "reduction of emission" and "avoidance of emission" are used synonymously in the present document, and mean that the quantity of VOCs and the total quantity of volatile organic compounds (TVOCs, total volatile organic compounds) are smaller, i.e. reduced, when comparison is made with a wood-based material without addition of additives in the invention.

The expression "avoidance of emission" covers, where appropriate, rather than a finding of a percentage reduction of emission, a reduction to a level that is below the measurement limit. The term "reduction" in the present document means the reduction extending as far as avoidance.

The expressions "lignocellulose-containing comminution products" and "lignocellulose particles" are used synonymously in the present document.

The process of the invention has the advantages of markedly reduced emission of VOCs inclusive of terpenes, acids and aldehydes. This reduction of emission can be achieved over a prolonged period, for example in the required region of 28 days. In preferred embodiments, the boards here exhibit no optical defects, while costs remain moderate after addition of the additives. There is no impairment of physical and mechanical properties of the resultant wood-based materials, for example in the form of OSB, lightweight or superlight fiberboard or wooden insulation board.

One of the advantages is that because emission of TVOCs is reduced, there is also low emission of substances that also contribute to an unpleasant odor of the wood-based materials, including acetic acid, and also of typical aldehyde odors of such boards, including the pungent odor of formaldehyde.

It is desirable that the additives of the invention reduce the quantity of aldehydes released. Aldehydes can be formed from the fundamental building blocks of cellulose or hemicellulose, an example being furfural from mono- and disaccharides of cellulose or of hemicellulose. Aromatic aldehydes are formed inter alia during the partial hydrolytic breakdown of lignin. The inventive combination of additives can accordingly be used to reduce emission of $C_1$ to $C_{10}$ aldehydes such as acetaldehyde, pentanal, hexanal, octenal or furfural.

The combination of additives can moreover reduce emission of organic acids, inclusive of alkane acids such as propionic acid, and also aromatic acids.

The quantity of terpenes is moreover reduced. These include monoterpenes and sesquiterpenes, inclusive of acyclic and cyclic monoterpenes.

Typical acyclic terpenes are terpene hydrocarbons such as myrcene, terpene alcohols such as geraniol, linalool, and ipsenol, and terpene aldehydes such as citral. Examples of monocyclic terpenes are p-menthane, terpinene, limonene and carvone, and examples of bicyclic terpenes are carane, pinane, bornane, and also 3-carene and alpha-pinene.

The term "comprising" includes "consisting of".

In one embodiment of the present invention, the first component of the combination of additives is activated carbon as porous carbon. Activated carbon means carbon structures made of very small graphite crystals and of amorphous carbons having porous structures and internal surface areas (BET surface areas) usually in the range from 300 to 2000 $m^2$/g. Activated carbon can be used in powder form, but preference is given to use in the form of granulate. It is preferable that the density of the activated carbon or the porous carbon is from 0.2 to 0.6 g/$cm^3$, where the preferred pore size of the porous carbon, in particular of the activated carbon, is in the range from ≤1 nm to 50 nm.

When the porous carbon, for example in the form of activated carbon, is brought into contact with the lignocellulose-containing comminution products, it can be in solid form as powder preferably with grain diameter smaller than 1 mm and/or as granulate, in particular as granulate with grain size from 2 to 8 mm.

Activated carbon can be produced from vegetable, animal or mineral feedstocks. The activated carbon can accordingly derive from black coal, charcoal, or lignite, or else from plant constituents, for example coconut shells, fruit kernels, etc., or else from bone char.

Activated carbon has a long history as absorbent, and is used by way of example in order to remove undesired or detrimental colorants and odorants from gases, vapors and liquids, etc. It is moreover used in chemical purification processes, and also for the absorption of, for example, toxic substances in the pharmaceutical sector. Activated carbon is known in those uses as short-term absorbent for liquids or gases, but not as an agent for permanent use, for example for permanent use in reducing quantities of volatile organic compounds and of very volatile organic compounds.

The quantity introduced of the first component of the combination of additives, the porous carbon for example in the form of an activated carbon can by way of example be in the range from 0.1 to 20% by weight, based on fully dried lignocellulose; in one embodiment, the quantity introduced which is brought into contact with the lignocellulose-containing comminution products is from 0.1 to 5% by weight, based on fully dried lignocellulose.

The use of the porous carbon, for example in the form of activated carbon, has a very wide variety of advantages. The activated carbon not only has the economic advantages of good availability and low price, but moreover permits reduction of emission of terpenes and acids in particular. Furthermore, this material can be metered in in dry form as solid during the production process, with no resultant increase in the moisture content of the starting materials and/or of the wood-based boards. There is no need to incur additional costs through additional drying, and these porous carbons moreover do not react with the adhesives used, and there is no alteration or impairment of the mechanical and physical properties of the resultant wood-based materials. Costs are low because, by virtue of the neutrality of the porous carbon in relation to the adhesive, there is no need for increased quantities of adhesive.

In another embodiment, the second component of the combination of additives is a hydrogensulfite salt selected from alkali metal, alkaline earth metal and ammonium hydrogensulfite salts, inclusive of sodium hydrogensulfite, ammonium hydrogensulfite, lithium hydrogensulfite, potassium hydrogensulfite, calcium hydrogensulfite and magnesium hydrogensulfite and combinations thereof. It has been found that use of the hydrogensulfite salt to further reduce the quantity of the unsaturated and saturated aldehydes of the TVOCs. It is possible here to use one hydrogensulfite salt or a mixture of various hydrogensulfite salts.

In one embodiment, the quantity of the second component of the combination of additives, the hydrogensulfite salt, brought into contact with the lignocellulose-containing comminution products is from 0.1 to 5% by weight of solid, based on fully dried lignocellulose, for example from 0.3% by weight to 3% by weight of solid, based on fully dried lignocellulose.

The additives here can be added at various times in the production process. It is possible here that the individual components of the combination of additives are added at various junctures of the production process, and may also be added separately and/or sequentially. The additive can be added either in solid form, an example being the porous carbon, for example the activated carbon, or else in the form of a suspension or dispersion, an example being an aqueous solution in respect of the hydrogensulfite salts.

In one embodiment, the porous carbon, for example as activated carbon, is added as powder granulate in solid form. In one embodiment, the second component, the hydrogensulfite salt, is metered in as solution, in particular as aqueous solution.

The components of the combination of additives can be added here in any of the regions of the required wood-based materials. In the case of wood-based boards, for example OSB, lightweight and superlight fiberboard and wooden insulation board, it is possible that the additive is present by way of example only in individual regions of these. A possibility here by way of example in the case of OSB is that the additive is metered into the outer layer and/or middle layer, possibilities here being that the various components are present in all of the layers, that the components are separately present in different layers, or that the components are present together in individual layers and alone in other layers.

In one embodiment here, the process of the invention can be one where the first component of the combination of additives, the porous carbon, in particular in the form of activated carbon, is brought into contact as additive with the lignocellulose-containing comminution products forming the middle layer. The porous carbon, for example in the form of activated carbon, is therefore used only in the middle layer. Surface defects, for example in the form of black spots on the visible surface of the wood-based materials, are thus avoided. In one embodiment of the present invention, the porous carbon is therefore not brought into contact with the lignocellulose-containing comminution products forming the outer layer.

In one embodiment, the second component of the combination of additives, the hydrogensulfite salt, can be present in all of the layers of the wood-based materials; in the case of wood-based board such as OSB, for example, this second component can be present not only in the middle layer but also in the outer layer. In one embodiment here, this second component is brought into contact with the lignocellulose-containing comminution products forming the outer layer, and in another embodiment it is brought into contact not only with the lignocellulose-containing comminution products forming the middle layer but also with those forming the outer layer.

Accordingly, further embodiments provide processes where the second component is at least brought into contact, as additive, with the lignocellulose-containing comminution products forming the outer layer. The present invention moreover provides processes where the first component of the combination of additives made of porous carbon, in particular activated carbon, is brought into contact, as additive, with the lignocellulose-containing comminution products forming the middle layer, and the second component of the combination of additives is at least brought into contact, as additive, with the lignocellulose-containing comminution products forming the outer layer, and preferably additionally is brought into contact with the lignocellulose-containing comminution products forming the middle layer.

It is possible here in the invention that the individual components of the combination of additives are present in various proportions by weight in the outer layer or middle layer. While by way of example the combination of porous carbon, for example in the form of activated carbon, and the hydrogensulfite salt are present together in the outer layer, the proportion of the hydrogensulfite salt in the middle layer can be smaller. In contrast thereto, the proportion of the hydrogen salt in the outer layer can be higher, when compared to the proportion of the hydrogensulfite salt in the middle layer. It is also possible, of course, that the proportions of the additive in the two layers are equal.

In another embodiment of the process of the invention, it is possible that at least one component of the combination of additives is added before the dryer and/or after the dryer and/or during the gluing procedure and/or before or after the gluing procedure.

In the case of OSB, it is possible here to add the porous carbon, for example in the form of activated carbon, onto the scattered strands. However, it is also possible that the addition takes place in the dryer, in the vertical duct before the scattering procedure, or in separate scattering apparatuses. In the case of wood-based boards such as OSB, it is therefore possible to introduce the activated carbon after scattering or laying of the lower outer layer, onto said outer layer, before the strands or the middle layer. It is also possible that the porous carbon is applied together with the lignocellulose-containing comminution products forming the middle layer, for example in the form of strands, onto the lower outer layer. In another embodiment, the activated carbon can be applied additionally or solely between middle layer and upper outer layer. When the activated carbon is applied separately, it is possible to avoid any glue coating which can possibly bring about partial deactivation of said porous carbon. In one embodiment, therefore, the first component in the form of the porous carbon is brought into contact with the comminution products after gluing of these.

The second component, the hydrogensulfite salt, can be brought into contact with the comminution products not only during the gluing procedure but also in the vertical duct before the scattering heads or else by way of a nozzle-application system after the scattering heads on the transport belt leading to the press. Particularly in embodiments where this second component is either present solely in the outer layer or is present in all of the layers, this second component can be brought into contact with the lignocellulose-containing comminution products before or after gluing with the adhesive, for example via a nozzle system, etc.

The components of the combination of additives can be brought into contact simultaneously, separately or sequentially with the lignocellulose-containing comminution products. As stated above, this can mean that one component, usually the porous carbon, for example in the form of activated carbon, is introduced in the dryer, in the vertical duct before the scattering procedure, or in separate scattering apparatuses, whereas the second component, the hydrogensulfite salt, as aqueous component in comminution products, is brought into contact before or after the gluing procedure or during the gluing procedure, for example via a nozzle system, etc. The person skilled in the art is aware of appropriate processes for bringing the respective components into contact.

Conventional adhesives can be used here with the combinations of additives. Adhesives used can be the conventional adhesives. These adhesives comprise phenol-formaldehyde adhesives (PF adhesives), adhesives based on isocyanates such as PMDI, polyurethane adhesives (PU-adhesives), urea-formaldehyde adhesives (UF adhesives), melamine-urea-formaldehyde adhesives (MUF adhesives), melamine-urea-phenol-formaldehyde adhesives (MUPF adhesives), tannin-formaldehyde adhesives (TF adhesives), and mixtures thereof. These combinations of additives are in particular also suitable for formaldehyde-free adhesives, for example those based on isocyanates.

In one embodiment, the adhesive is a non-formaldehyde-containing adhesive, for example an adhesive based on isocyanates such as PMDI, or a PU adhesive.

The term lignocellulose in the present document means cellulose-containing materials, for example wood. Comminution products of lignocellulose materials comprise in particular wood strands, wood chips, wood fibers, and also wood veneers.

The lignocellulose materials, and also the wood-based materials and comminution products therefrom can be softwoods or hardwoods. Mixtures of these two types of wood are also possible. Preference is given to lignocellulose-containing comminution products by way of example in the form of wood chips, strands or wood fibers of softwoods. The process for the production of the wood-based materials, in particular wood-based boards, can be a conventional process. The process can also be supplemented, where appropriate, by other processes known to the person skilled in the art for reducing emission of volatile organic compounds and very volatile organic compounds, etc.

Another aspect of the present invention is directed to the use of a combination of porous carbon, in particular activated carbon, with a hydrogensulfite salt, in particular ammonium hydrogensulfite, as combination of additives in the production of wood-based materials from lignocellulose in order to reduce VOC emission, characterized in that the components of the additives are introduced or applied together, separately or sequentially during the process of production of the wood-based material. In one embodiment, the use here is one where the first component made of porous carbon, in particular activated carbon, is used as additive to the middle layer of OSB and/or the second component in the combination of additives is used at least in the outer layer of the OSB. In one embodiment, the first component can also be used in the middle layer together with the first component of this OSB.

In particular in embodiments where the first component is present in the middle layer, while the second component is present either alone in the outer layer or in the outer layer and in the middle layer of the resultant wood-based boards, it is possible to provide wood-based boards with surface having no optical defects and with reduced VOC emission inclusive of terpenes, acids and aldehydes (saturated and unsaturated aldehydes). Production costs are moderate and moreover there is no impairment of the mechanical and physical properties of these boards.

Finally, wood-based materials are provided which are obtainable by the process of the invention or with inventive use of the combination of additives with porous carbon and hydrogensulfite salt. The wood-based material is in particular OSB, lightweight or superlight fiberboard, or wooden insulation board.

The invention is explained in more detail below with the aid of examples, but is not restricted thereto.

Inventive Example 1

Strands for the outer and middle layer of an OSB are produced from 100% softwood. These are dried and introduced into the gluing procedure. Ammonium bisulfite (1.5% by weight, based on strands) is added to the strands in the separate gluing procedure for the outer layer. The concentration of the ammonium bisulfite solution here was about 70% by weight. The activated carbon is added only to the strands of the middle layer. This is achieved here during the gluing procedure. The quantity is 2.5% by weight, based on strands. The average size of the activated carbon particles here was about 4 mm. The strands are then compression-molded in a Conti-Press to give OSB. There is no need for any specific modification of the production parameters of the process. The resultant boards are cooled in a star cooler. A sample (in this case 100×500 mm) is cut from a board and tested for emissions in a test chamber together with a control sample (without additive) and an OSB comprising only 2.5% by weight of activated carbon in the middle layer. This test was carried out in accordance with the AgBB system. The table below lists the most important individual parameters from the test reports. The values are emission values after 28 days of test time. Whereas the control sample and the board with 2.5% by weight in the middle layer failed to comply with the requirements of the AgBB system, the experimental board with activated carbon in the middle layer and ABS in the outer layer complied with those requirements. The color of the boards was assessed as identical. Nor were there any significant differences in technological values, inclusive of transverse tensile strength, flexural strength and swelling factor.

TABLE 1

| Parameter | Control sample in µg/m$^3$ | Experimental board (2.5% by weight of activated carbon in middle layer) in µg/m$^3$ | Experimental board (2.5% by weight of activated carbon in middle layer + 1.5% by weight of ABS in outer layer) in µg/m$^3$ |
|---|---|---|---|
| Octenal | 57 | 21 | 7 |
| Acetic acid | 114 | 90 | 21 |
| Hexanal | 378 | 312 | 52 |

TABLE 1-continued

| Parameter | Control sample in µg/m³ | Experimental board (2.5% by weight of activated carbon in middle layer) in µg/m³ | Experimental board (2.5% by weight of activated carbon in middle layer + 1.5% by weight of ABS in outer layer) in µg/m³ |
|---|---|---|---|
| a-Pinene | 173 | 140 | 81 |
| n-Caproic acid | 201 | not detectable | 1 |

Inventive Example 2

Strands for the outer and middle layer of an OSB are produced from 100% softwood. These are dried and introduced into the gluing procedure. An ammonium bisulfite solution (1.0% by weight, based on strands) is added to the strands in the separate gluing procedure for the outer layer. In the separate gluing procedure for the middle layer, 0.7% by weight, based on strands, was added. The concentration of the ammonium bisulfite solution in both cases was about 70% by weight. The activated carbon is added only to the strands of the middle layer. This takes place here during the gluing procedure. The quantity is 2.5% by weight, based on strands. The average size of the activated carbon particles here was about 4 mm. The strands are then compression-molded in a Conti-Press to give OSB. There is no need for any specific modification of the production parameters of the process. The resultant boards are cooled in a star cooler. A sample (100×500 mm) is cut from a board and tested as described in the AgBB system for emissions in a test chamber together with a control sample. Whereas the control sample failed to comply with the requirements of the AgBB system, the experimental board complied with those requirements.

Inventive Example 3

By analogy with Inventive Example 2, strands for the outer and middle layer of an OSB were produced from 100% softwood. These were dried and introduced into the gluing procedure. In the separate gluing procedure for the outer layer, an ammonium bisulfite solution (1.0% by weight, based on strands) was added to the strands. In a separate gluing procedure for the middle layer, an ammonium bisulfite solution (1.0% by weight, based on strands) was likewise added together with activated carbon, the quantity of which was 2.0% by weight, based on the strands; the concentration of the ammonium bisulfite solution was about 70% by weight. The average size of the activated carbon particles here was about 4 mm. The strands were then compression-molded in a Conti-Press to give OSB. By analogy with Inventive Example 2, samples were obtained and tested for emission as described in the AgBB system in a test chamber. Table 2 shows the values for emission after 3 days and 7 days:

| Parameter | Emission after 3 days in µg/m³ | Emission after 7 days in µg/m³ |
|---|---|---|
| Formaldehyde | 20 | 18 |
| Acetaldehyde | 40 | 30 |
| Acetone | 225 | 213 |
| Hexanal | 25 | 27 |
| Alpha-Pinene | 140 | 112 |
| Camphene | 12 | 10 |
| Benzaldehyde | 8 | 4 |
| Beta-Pinene | 21 | 16 |
| 3-Carene | 150 | 121 |
| 1-Isopropyl-2-methylbenzene | 10 | 7 |
| Limonene | 16 | 12 |
| Terpenes, other | 3 | 1 |
| Acetophenone | 1 | 1 |
| Other alkylbenzenes | 4 | 3 |
| Terpenes, other | 8 | 5 |
| Terpenes, other | 10 | 6 |
| Longipinene | 3 | 1 |
| Longifolene | 7 | 5 |
| Caryophyllene | 3 | 2 |
| n-Pentadecane | 3 | 1 |
| Terpenes, other | 4 | 3 |

From the inventive example it is clear that an OSB with ammonium bisulfite in the outer layer and in the middle layer, and also activated carbon in the middle layer, complies with the requirements of the AgBB system.

The examples reveal that the two additives used in a very wide variety of combinations (use in outer layer/middle layer) greatly reduce TVOC emission.

What is claimed is:

1. A process for the production of wood-based materials made of lignocellulose, the wood-based materials being reduced in its emission of volatile organic compounds (VOCs) inclusive of terpenes, acids and aldehydes, comprising the following steps:
   a) provisioning of lignocellulose-containing comminution products;
   b) bringing the lignocellulose-containing comminution products into contact with a combination of additives with a first component made of a porous carbon and a second component made of a hydrogensulfite salt; and
   c) compression-molding of the lignocellulose-comminution products admixed with the combination of additives, with heat treatment, with adhesive to produce the wood-based materials.

2. The process as claimed in claim 1, wherein the first component of the combination of additives is activated carbon.

3. The process as claimed in claim 2, wherein when the activated carbon, is brought into contact with the lignocellulose-containing comminution products it is in solid form as powder and/or as granulate.

4. The process as claimed in claim 2, wherein an internal surface area of the activated carbon is from 300 to 2000 m²/g and/or the density is from 0.2 to 0.6 g/cm³ and the average pore size thereof is from ≤1 nm to 50 nm.

5. The process as claimed in claim 1, wherein a quantity used of the first component of the combination of additives is from 0.1 to 20% by weight based on fully dried lignocellulose.

6. The process as claimed in claim 1, wherein the second component of the combination of additives is a hydrogensulfite salt selected from sodium hydrogensulfite and ammonium hydrogensulfite and combinations thereof.

7. The process as claimed in claim 1, wherein a quantity used of the second component of the combination of additives is from 0.1 to 5% by weight of solid, based on fully dried lignocellulose.

8. The process as claimed in claim 2, wherein the first component made of activated carbon is brought into contact, as additive, with the lignocellulose-containing comminution products forming a middle layer.

9. The process as claimed in claim 8, wherein the second component is brought into contact, as additive, at least with the lignocellulose-containing comminution products forming an outer layer.

10. The process as claimed in claim 9, wherein the first component of the combination of additives made of activated carbon is brought into contact, as additive, with the lignocellulose-containing comminution products forming the middle layer, and the second component of the combination of additives is at least brought into contact, as additive, with the lignocellulose-containing comminution products forming the outer layer, and additionally with the lignocellulose-containing comminution products forming the middle layer.

11. The process as claimed in claim 9, wherein the first component of the combination of additives, the activated carbon, is applied between the middle layer and the outer layer.

12. The process as claimed in claim 1, wherein at least one component of the combination of additives is added before a dryer and/or after the dryer and/or during a gluing procedure and/or before or after the gluing procedure.

13. The process as claimed in claim 1, wherein the first component and the second component of the combination of additives are brought into contact simultaneously, separately or sequentially with the lignocellulose-containing comminution products.

14. A combination of porous activated carbon with a hydrogensulfite salt as a combination of additives in wood-based materials made of lignocellulose to reduce emission of VOCs, wherein the components of the additives are introduced or applied together, separately or sequentially during the process of production of the wood-based material.

15. The combination as claimed in claim 14, wherein a first component made of porous carbon is activated carbon, and is an additive to a middle layer of oriented strand board (OSB) and/or a second component of the combination of additives is at least in an outer layer of the OSB and also in a middle layer of the OSB.

16. A wood-based material obtainable by using a process as claimed in claim 1, is an oriented strand board (OSB), lightweight or superlight fiberboard or wooden insulation board.

17. The process as claimed in claim 2, wherein a quantity used of the first component of the combination of additives is from 0.1 to 5% by weight based on fully dried lignocellulose.

18. The process as claimed in claim 1, wherein a quantity used of the first component of the combination of additives is from 0.1 to 5% by weight based on fully dried lignocellulose.

19. The process as claimed in claim 2, wherein when the activated carbon is brought into contact with the lignocellulose-containing comminution products it is in solid form as granulate with grain size from 2 to 8 mm.

20. The process as claimed in claim 1, wherein the activated carbon is composed of carbon structures made of graphite crystals and of amorphous carbons having porous structures.

21. The process as claimed in claim 20, wherein the porous structures have an internal surface areas (BET surface areas) in a range from 300 to 2000 $m^2/g$.

22. The process as claimed in claim 20, wherein the activated carbon has a density of from 0.2 to 0.6 $g/cm^3$.

23. The process as claimed in claim 20, wherein a pore size of the activated carbon is in a range from <1 nm to 50 nm.

24. The process as claimed in claim 20, wherein the activated carbon is a powder with grain diameter smaller than 1 mm and/or as granulate with grain size from 2 to 8 mm.

25. The process as claimed in claim 20, wherein the activated carbon is introduced in a dryer, before a scattering procedure or in separate scattering apparatuses, whereas the hydrogensulfite salt, as an aqueous component, is brought into contact before or after a gluing procedure or during the gluing procedure.

26. The combination of claim 14, wherein the hydrogensulfite salt is ammonium hydrogensulfite.

* * * * *